July 9, 1935.　　　　S. JENCICK　　　　2,007,606
TREE BRACE
Filed Feb. 14, 1934
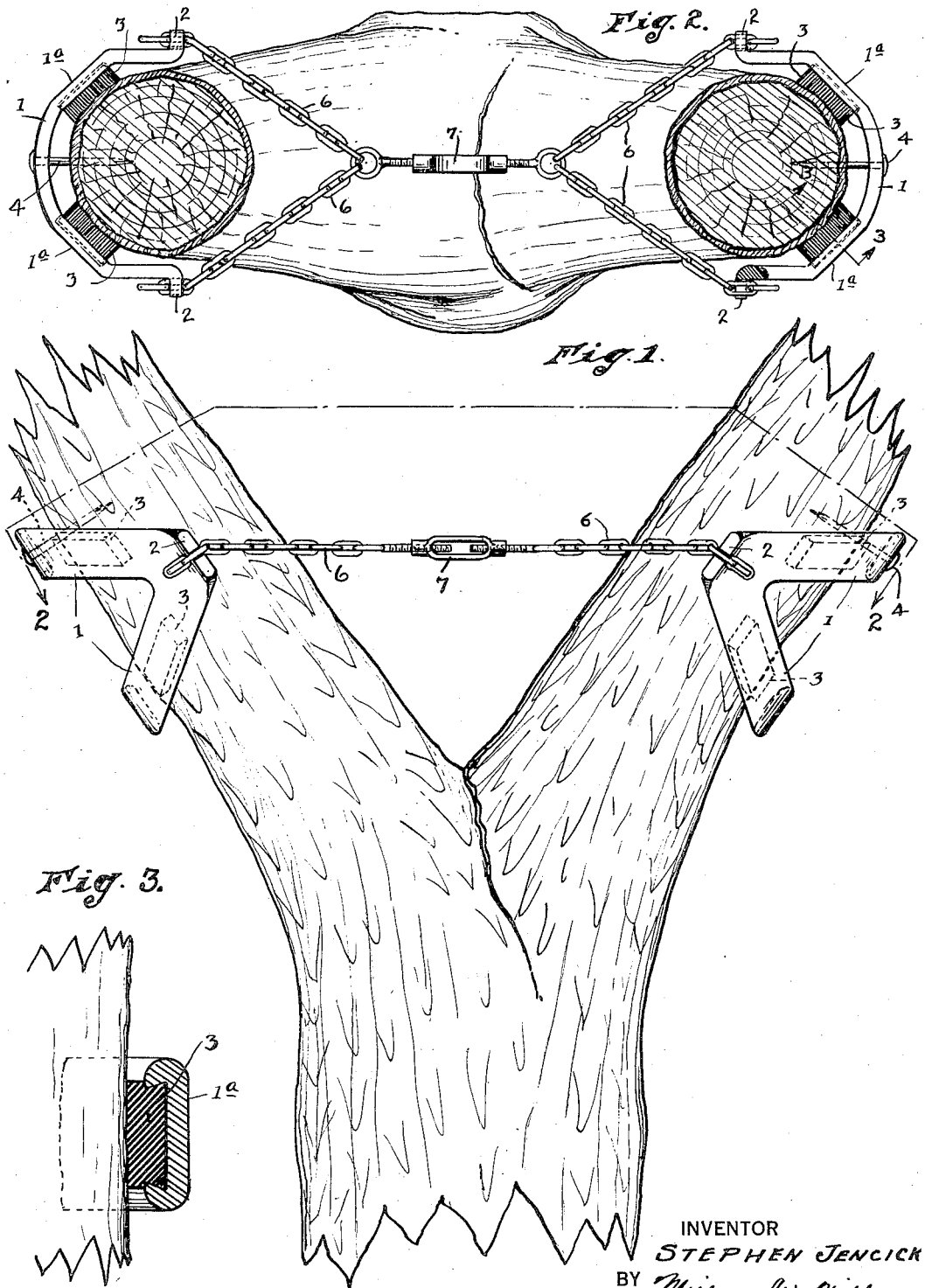
INVENTOR
STEPHEN JENCICK
BY *Milburn and Milburn*
ATTORNEYS.

Patented July 9, 1935

2,007,606

UNITED STATES PATENT OFFICE 2,007,606

TREE BRACE

Stephen Jencick, Chagrin Falls, Ohio

Application February 14, 1934, Serial No. 711,160

9 Claims. (Cl. 47—42)

This invention relates to an improved form of device for bracing the limbs of a tree.

Heretofore, it has been the practice to bore a hole diametrically through each limb and to fasten a bolt in each hole for the purpose of anchoring the ends of a cable. This old practice not only involves considerable labor in boring the holes and applying the bracing means to the limbs, but this boring of the limbs is injurious to the tree. Furthermore, the bolts become embedded within the limbs and are consequently no longer removable. This old practice possesses other disadvantages which will be apparent upon comparison with the form of device now to be described.

The object of my invention is to provide a device which engages only the outer part of the outside surface of each limb and thus eliminates the drilling of holes through the limbs.

It is also an object to provide an adjustable flexible means for connecting the cradles, which engage the limbs, and to provide also a means for preventing the cradles from falling below their given position in case of slackening of the connecting means.

A further object is to provide such a device which can be applied to a tree without the necessity and expense of employing experts or even skilled labor.

Another object consists in providing cushioning means between the cradles and the limbs.

Other objects will be apparent from the following description and claims when considered together with the accompanying drawing.

Fig. 1 illustrates my improved bracing device applied to the limbs of a tree;

Fig. 2 is principally a plan view of the same taken on line 2—2 of Fig. 2; and

Fig. 3 is a view taken on line 3—3 of Fig. 2.

It is to be understood that the present disclosure is merely for purposes of illustration and that various other modifications may be made without departing from the spirit of the present invention as herein set forth and claimed.

The cradles, which are of duplicate form and size for a given size of limb, each comprise a pair of diverging substantially U-shaped arms 1, which are adapted to extend approximately half-way about the tree limb so that the ends 2 thereof are approximately at the opposite ends of a diameter through the limb. These cradles are formed of suitable metal and may be given any suitable contour, as for instance that shown in Fig. 2 in which there are flat portions 1ª provided for suitable attachment or bearing engagement of cushion inserts 3 of rubber or other suitable material. The rubber pads 3 are properly curved so as to engage snugly with the surface of the limb. As indicated in Fig. 2, there are provided two pads 3 upon each arm 1 and they are each located approximately forty-five degrees (45°) from the adjacent ends of the arm 1 and approximately ninety degrees (90°) from each other. At a point approximately equi-distant between the rubber pads 3, there is located a nail 4 which extends through the arm 1 and is adapted to be driven into the limb in order to prevent the cradle from falling when the connecting means between the cradles slackens, as for instance when the distance between the limbs is lessened by the swaying of the same in a wind. One such nail in the upper arm 1 is sufficient. Such a nail is of comparatively small size and will not injure the tree.

The means for connecting the cradles consists of flexible chains 6 which have their ends detachably connected to the slotted projections 2 on the ends of the cradles and which are connected in each case by a turnbuckle 7 for tightening or loosening the same. The ends of the chains are easily attached to the cradles and the cross link in each case will prevent the chain from pulling through the narrow slot in which the adjacent link is placed.

It will be observed that the cradles contact the limbs only at the points of engagement of the cushion members 3 and that the ends of the cradles are so spaced from the limbs that the chains 6 also do not engage the limbs. Thus, the bracing action of the chains and cradles is not interfered with and the limbs are not scarred by the device.

For tree limbs of different diameters, I may select cradles of different sizes, including the chains 6, and the size and length of turnbuckles will be selected according to the distance between the points of attachment. Thus, the parts of my device may be standardized and kept in stock so as to be able to conveniently assemble the proper combination of cradles, chains and turnbuckles according to any given set of conditions. A table of data and sizes may be kept showing the size of cradle and chains 6 and turnbuckle 7 for bracing limbs having different dimensions and spaced different distances apart at the points where it is desired to apply the bracing means. With a table or chart showing the proper sizes of cradles and chains and turnbuckles for different sets of conditions to be treated, the most effective form of device can be conveniently and quickly selected and assembled, when once the measurements of the limbs and the distance between the limbs are known.

The combination of chains 6 and turnbuckle 7 may be regarded as a unit and may be kept in stock as such and may be so listed in the table of sizes for different sets of conditions, as above referred to. As a modification, especially where there is a comparatively wide span between the limbs, the turnbuckle may form part of an intermediate single extent of chain which is connected or is adapted to be connected at its two ends as a separate unit to the ends of chains 6.

This form of device can be conveniently applied to or removed from the limbs of a tree either by the user himself or with the help of unskilled labor, and any adjustment can be made therein with the same convenience. Also, there is an effective binding engagement of the device with the tree limbs and the rubber pads 3 permit a certain degree of flexibility of engagement. These pads will also become attached to the limbs by natural adhesion but without any injury to the limbs or to the pads themselves. Any of the parts of my device may be conveniently renewed from time to time, if and when found necessary or desirable.

Thus, my device is extremely efficient and involves less cost than other devices heretofore employed.

What I claim is:

1. A device for bracing the limbs of a tree, comprising a pair of cradles adapted to engage about the outer portions of the limbs, and intermediate connecting means extending between and including diverging portions connected directly to the ends of said cradles.

2. A device for bracing the limbs of a tree, comprising a pair of cradles adapted to engage about the outer portions of the limbs, and adjustable means extending between and including diverging portions connected directly to the ends of said cradles.

3. A device for bracing the limbs of a tree, comprising a pair of rigid cradles adapted to engage about the outer portions of the limbs, adjustable flexible means extending between and connecting said cradles, and means for holding said cradles in a given position, whereby the flexible means may slacken without the cradles falling.

4. A device for bracing the limbs of a tree, comprising a pair of substantially U-shaped cradles adapted to engage about the outer portions of the limbs and to contact only the outer surface thereof, means extending about the inner side of each limb and directly connecting the ends of each U-shaped cradle, and means extending between the limbs and connected directly to said last-named connecting means.

5. A device for bracing the limbs of a tree, comprising a pair of substantially U-shaped cradles adapted to engage about the outer portions of the limbs and to contact only the outer surface thereof, cushion means provided upon the inner face of said cradles for engagement with the limbs, and means extending between and connected to the ends of said cradles.

6. A device for bracing the limbs of a tree, comprising a pair of substantially U-shaped cradles adapted to engage about the outer portions of the limbs and to contact only the outer surface thereof, cushion means provided upon the inner face of said cradles for engagement with the limbs, means for holding said cradles in a given position, flexible means extending about the inner side of each limb and connecting the ends of each U-shaped cradle, and adjustable means extending between and connecting said last-named connecting means, whereby the flexible means may slacken without the cradles falling.

7. A device for bracing the limbs of a tree, comprising a pair of cradles, each cradle having diverging U-shaped arms adapted to extend about the outer portions of the limbs and each terminating at substantially opposite sides of the tree limb, cushion means provided upon the inner surface of each arm of each cradle and adapted to engage the surface of the limb at points approximately forty-five degrees (45°) from the ends of the arm and to space the main part of each arm of each cradle from the limb, means provided upon at least one arm of each cradle at a point between said cushion means for maintaining the same in a given position, and adjustable flexible means extending between and connecting the ends of said cradles, whereby there will be obtained a two-point engagement between each arm of each cradle and the respective limbs, and the connecting means may slacken without the cradles falling from their normal points of engagement with the limbs.

8. A device for bracing the limbs of a tree, comprising a pair of substantially U-shaped cradles adapted to engage about the outer portions of the limbs and to contact only the outer surface thereof, said cradles each terminating at substantially opposite sides of the tree limb, and adjustable flexible means extending between and having diverging portions connected directly to the ends of said cradles.

9. A device for bracing the limbs of a tree, comprising a pair of substantially U-shaped cradles adapted to engage about the outer portions of the limbs and to contact only the outer surface thereof, said cradles each terminating at substantially opposite sides of the tree limb, and flexible means extending between and having diverging portions connected in a readily detachable manner and directly to the ends of said cradles.

STEPHEN JENCICK.